US006183130B1

(12) United States Patent
Adams et al.

(10) Patent No.: US 6,183,130 B1
(45) Date of Patent: Feb. 6, 2001

(54) APPARATUS FOR SUBSTRATE TEMPERATURE MEASUREMENT USING A REFLECTING CAVITY AND DETECTOR

(75) Inventors: Bruce Adams, Portland, OR (US);
Aaron Hunter, Santa Cruz, CA (US);
Alex Rubinchik, San Jose, CA (US);
Mark Yam, San Jose, CA (US); Paul A. O'Brien, San Jose, CA (US)

(73) Assignee: Applied Materials, Inc., Santa Clara, CA (US)

( * ) Notice: Under 35 U.S.C. 154(b), the term of this patent shall be extended for 0 days.

(21) Appl. No.: 09/130,253

(22) Filed: Aug. 6, 1998

Related U.S. Application Data

(63) Continuation-in-part of application No. 09/026,855, filed on Feb. 20, 1998, now Pat. No. 6,007,241, and a continuation-in-part of application No. 09/044,217, filed on Mar. 18, 1998.

(51) Int. Cl.[7] .............................. G01J 5/08; G01J 5/00; A21B 1/00

(52) U.S. Cl. ..................... 374/131; 374/130; 374/121; 219/405

(58) Field of Search ............................ 374/130, 131, 374/161, 120, 121; 219/405

(56) References Cited

U.S. PATENT DOCUMENTS

| 3,796,099 | 3/1974 | Shimotsuma et al. ............... 374/126 |
| 4,408,878 | 10/1983 | Fischbach ............................ 356/43 |
| 4,611,930 | 9/1986 | Stein ................................... 374/126 |
| 4,659,234 | 4/1987 | Brouwer et al. .................... 374/121 |
| 4,708,474 | 11/1987 | Suarez-Gonzalez ................. 356/45 |
| 4,881,823 | 11/1989 | Tanaka et al. ...................... 374/126 |
| 4,919,542 | 4/1990 | Nulman et al. ......................... 374/9 |
| 4,956,538 | 9/1990 | Moslehi ............................ 219/121.6 |
| 4,979,134 | 12/1990 | Arima et al. ........................ 702/135 |
| 5,011,295 | 4/1991 | Krishnan et al. ................... 374/126 |
| 5,029,117 | 7/1991 | Patton ................................ 702/135 |
| 5,156,461 | 10/1992 | Moslehi et al. .................... 374/121 |
| 5,226,732 | 7/1993 | Nakos et al. ....................... 374/133 |
| 5,326,171 | 7/1994 | Thompson et al. ................ 374/121 |
| 5,660,472 | 8/1997 | Peuse et al. ....................... 374/128 |
| 5,755,511 | 5/1998 | Peuse et al. ....................... 374/128 |

FOREIGN PATENT DOCUMENTS

| 0 612 862 A1 | 8/1994 | (EP) . |
| 0256254 | * 10/1990 | (JP) .................................... 374/130 |

OTHER PUBLICATIONS

Apte et al., "Rapid Thermal Processing Uniformity Using Multivariable Control of a Circularly Symmetric 3 Zone Lamp," *IEEE Transactions on Semiconductor Manufacturing*, 5, 180–188, Aug. 1992.

Deardorff, "Eliminaton of reflection errors in emissometers by using alternate apertures," *Rev. Sci. Instrum.*, vol.47, No. 10:1279–1282, Oct. 1976.

(List continued on next page.)

*Primary Examiner*—Diego Gutierrez
*Assistant Examiner*—Stanley J. Pruchnic, Jr.
(74) *Attorney, Agent, or Firm*—Fish & Richardson

(57) ABSTRACT

A temperature sensor for measuring a temperature of a substrate in a thermal processing chamber is described. The chamber includes a reflector forming a reflecting cavity with a substrate when the substrate is positioned in the chamber. The temperature sensor includes a probe having an input end positioned to receive radiation from the reflecting cavity, and a detector optically coupled to an output end of the probe. The radiation entering the probe includes reflected radiation and non-reflected radiation. The detector measures an intensity of a first portion of the radiation entering the probe to generate a first intensity signal and measures an intensity of a second portion of the radiation entering the probe to generate a second intensity signal. The detector is configured so that a ratio of the reflected radiation to the non-reflected radiation is higher in the first portion than the second portion. The two intensity signals are used to calculate the temperature and emissivity of the substrate.

28 Claims, 8 Drawing Sheets

OTHER PUBLICATIONS

Dilhac et al., "Temperature Control in a Rapid Thermal Processor," *IEEE Transactions on Electrons on Electron Devices*, 39, 201–203, Jan. 1992.

Doering, "Microelectronics Manufacturing Science and Technology Program Extends Capabilities in Integrated Circuit Manufacturing," *Microelectronics Manufacturing Science & Technology*, 2–64, Sep. 1992.

Gouffe, *Revue D'optique 24*, translation, 1–10, 1945.

Gyurcsik, et al., "A Model for Rapid Thermal Processing: Achieving Uniformity Through Lamp Control," *IEEE Transactions on Semiconductor Manufacturing*, 4, 9–13, Feb. 1991.

Hernandez, et al., "Determination de L'emissivite a haute temperature a l'aide de systemes a fibres optiques equipes d'hemispheres reflecteurs," *J. Phys. III France*, 1575–1586, May 1991 (Translation).

Honda et al., "New Radiation Thermometry Using Multiple Reflection for Temperature Measurement of Steel Sheets," in Shudley, "Temperature, Its Measurement & Control in Science and Industry" *American Institute of Physics*, 923–927, New York, 1992.

Norman, "Optimization of Transient Temperature Uniformity in RTP Systems," *IEEE Transactions on Electron Devices*, 205–207, Jan. 1992.

Pikashov et al., "Determining Emissivity and True Surface Temperature by Means of a Pyrometer and an Attachment," *Gas Institute, Kiev*, translated from Inzhenerno–Fizicheskii Zhurnal, 16, 723–730, Apr. 1969.

Roozeboom, "Manufacturing Equipment Issues in Rapid Thermal Processing," *Rapid Thermal Processing Science and Technology*, 389–423, 1993.

Roozeboom, "Rapid Thermal Processing: Status, Problems and Options After the First 25 years," *Mat. Res. Soc. Symp. Proc.*, 303, 149–164, 1993.

Sorrell et al., "Temperature Uniformity in RTP Furances," *IEEE Transactions on Electron Devices*, 39, 75–80, Jan. 1992.

* cited by examiner

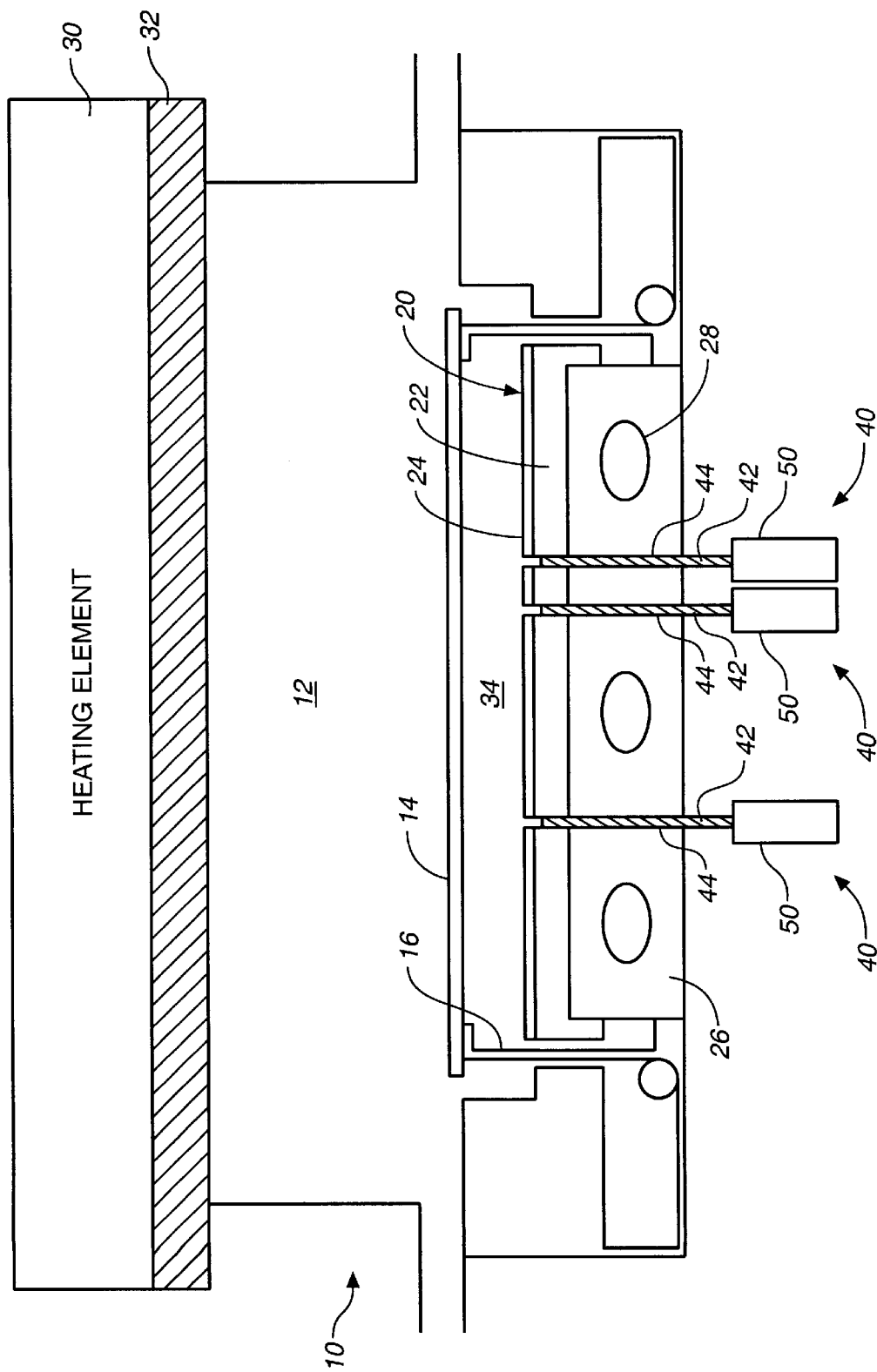
FIG._1

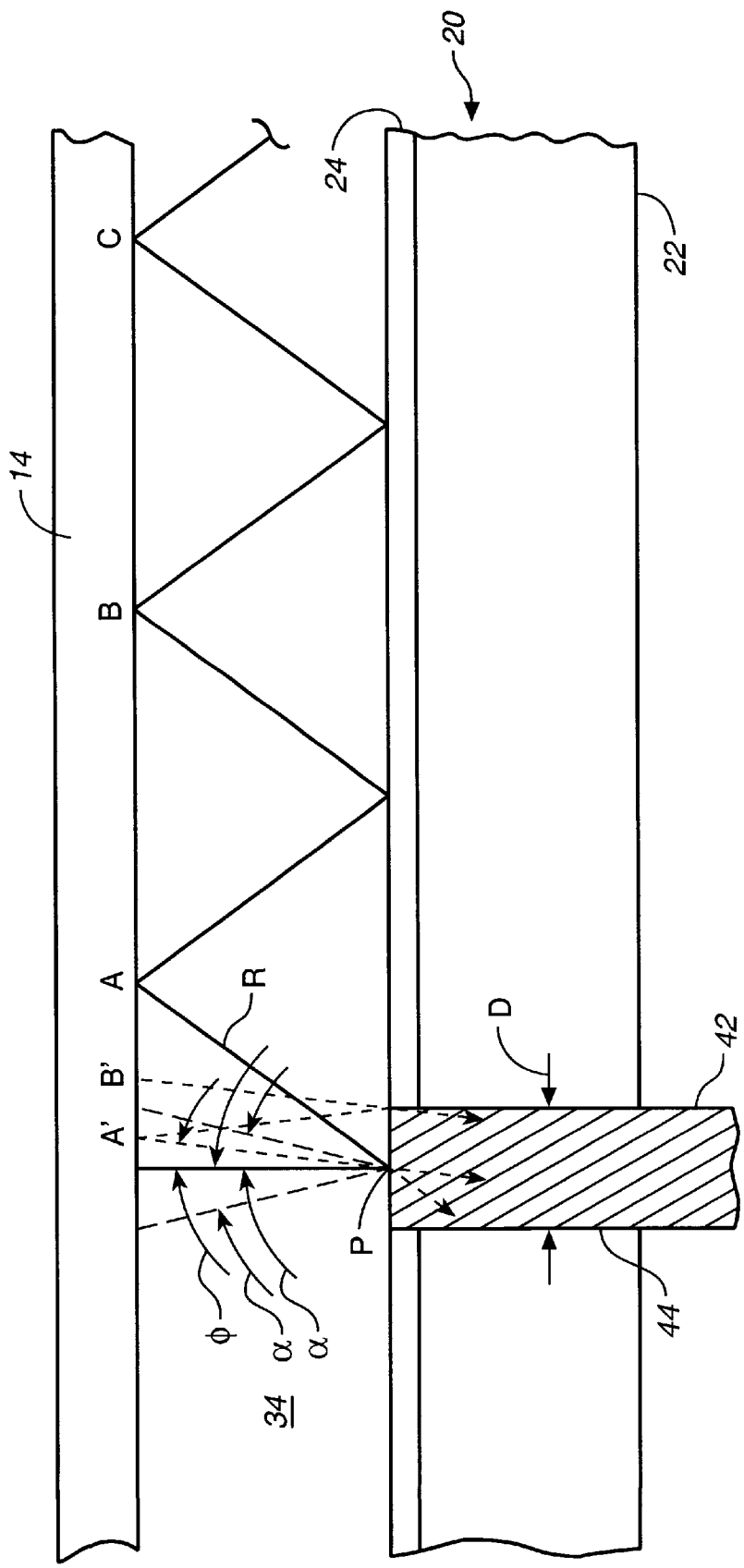
FIG._2

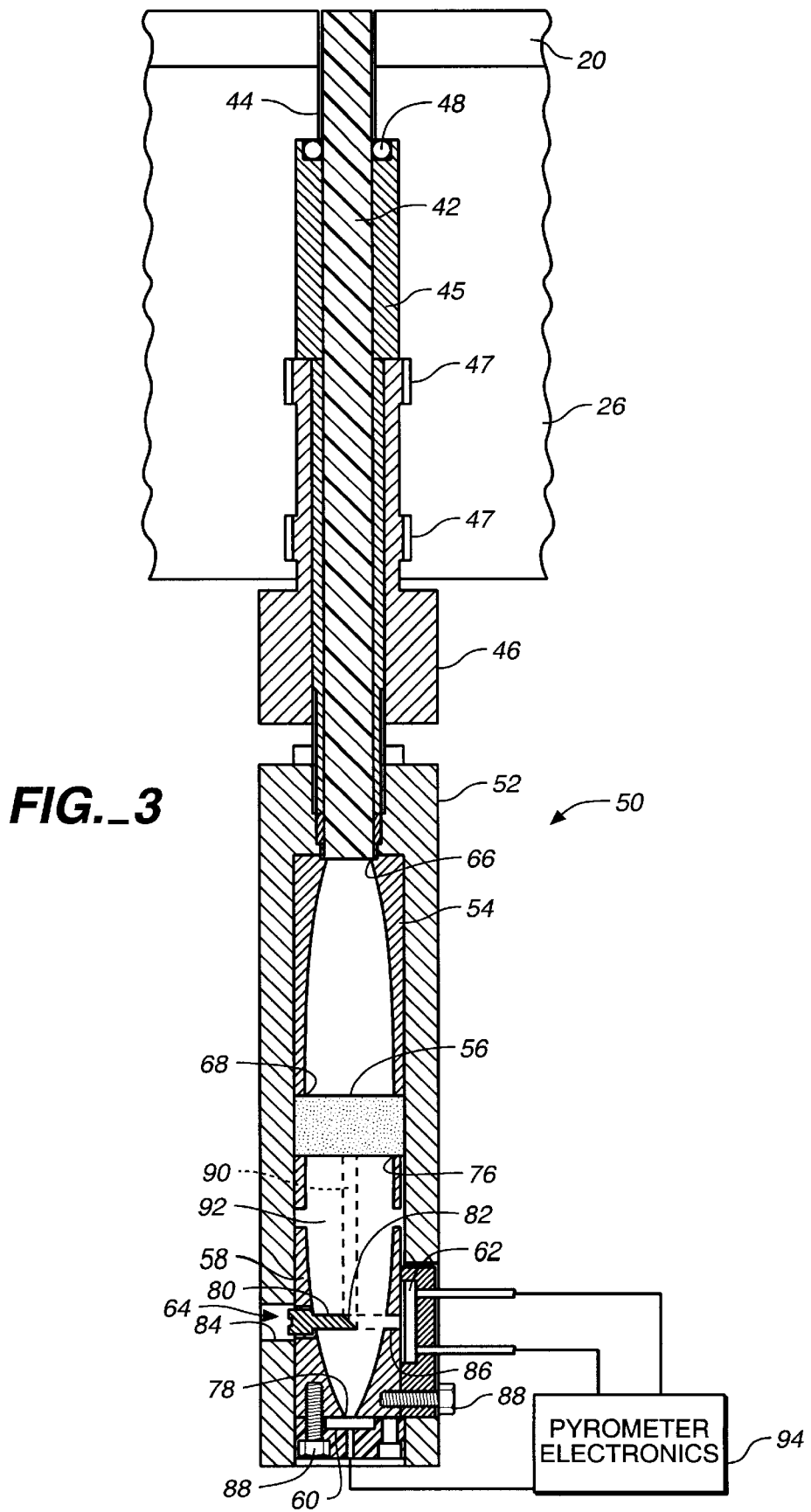
FIG._3

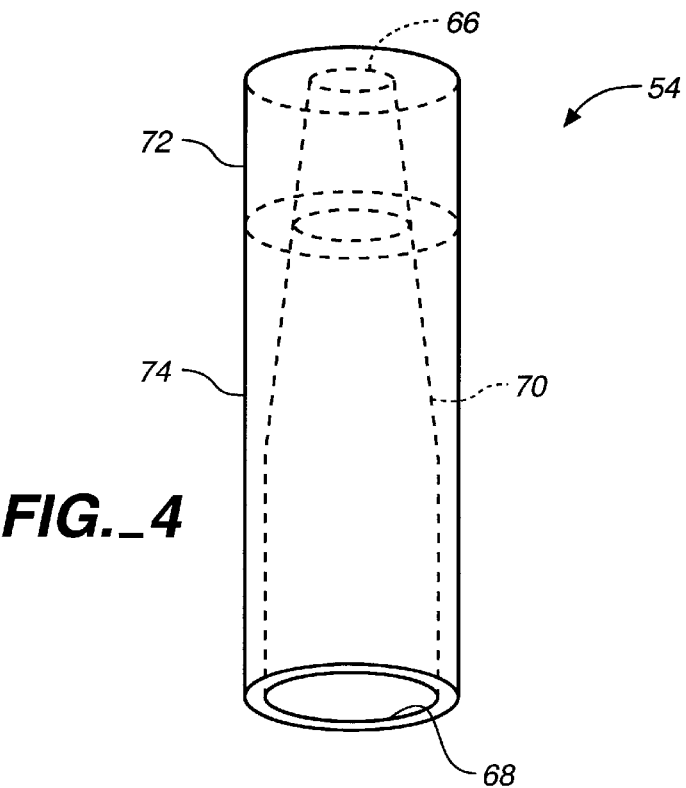
FIG._4
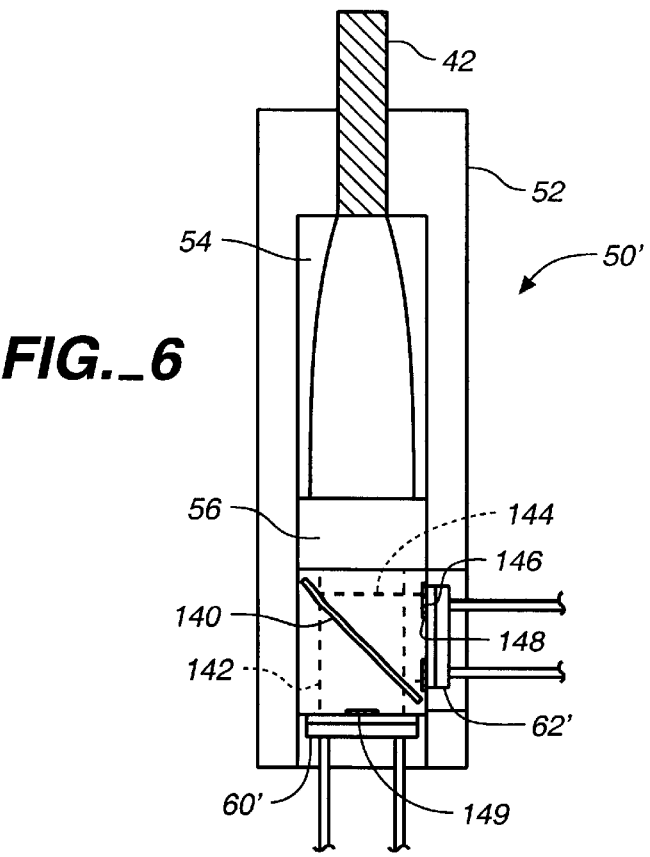
FIG._6

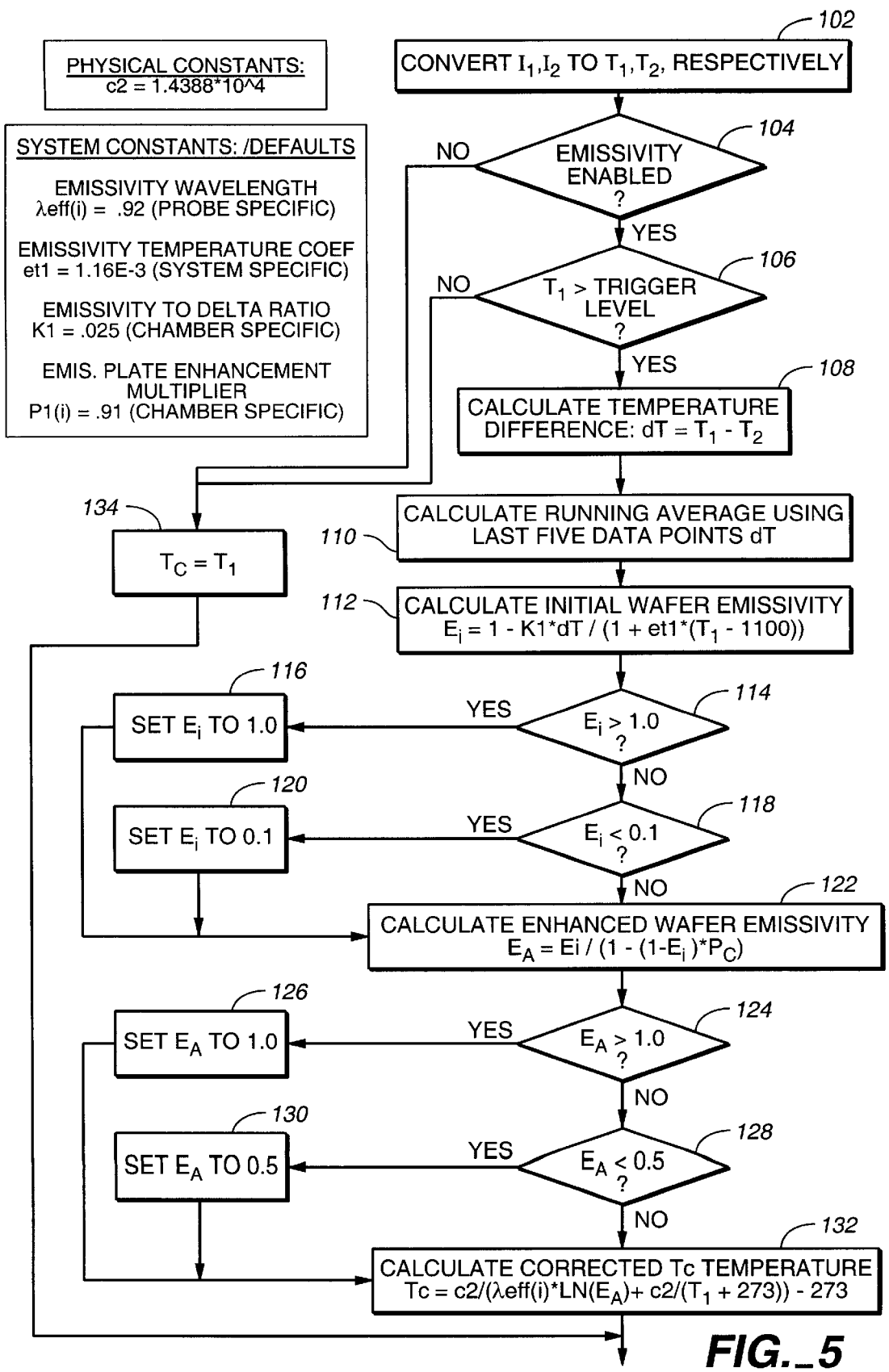
FIG._5

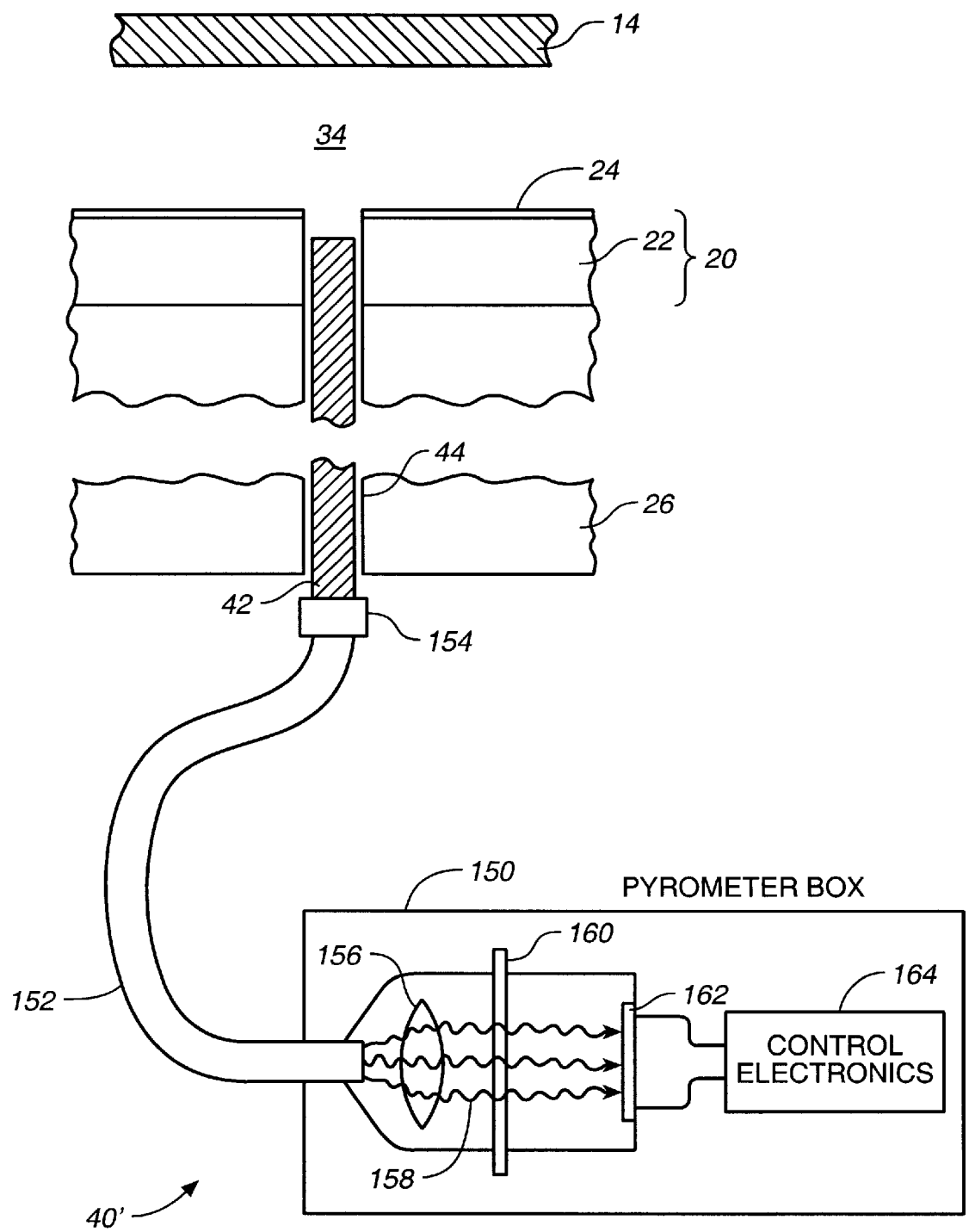
FIG._7

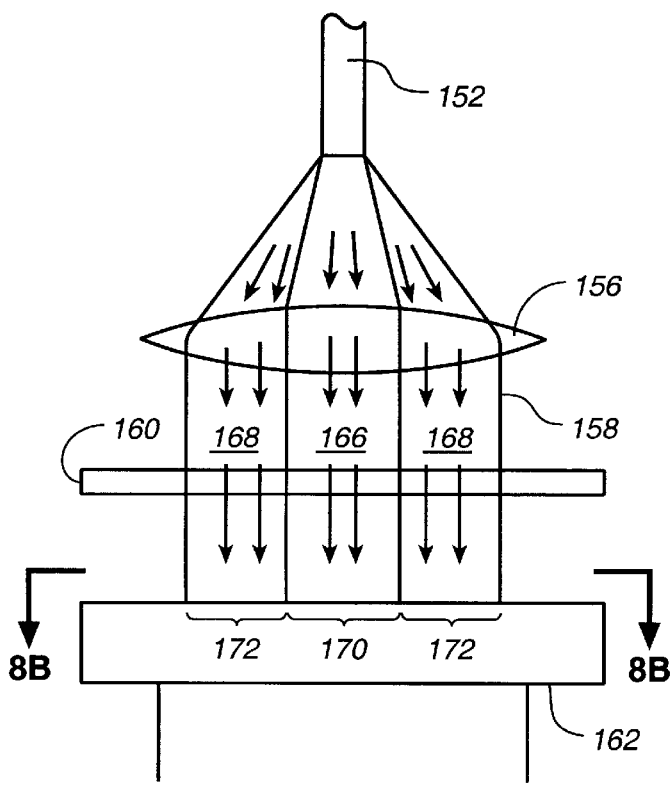
FIG._8A
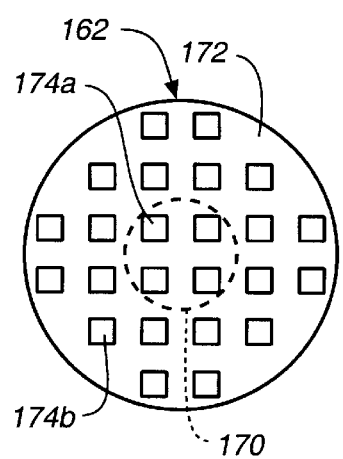
FIG._8B
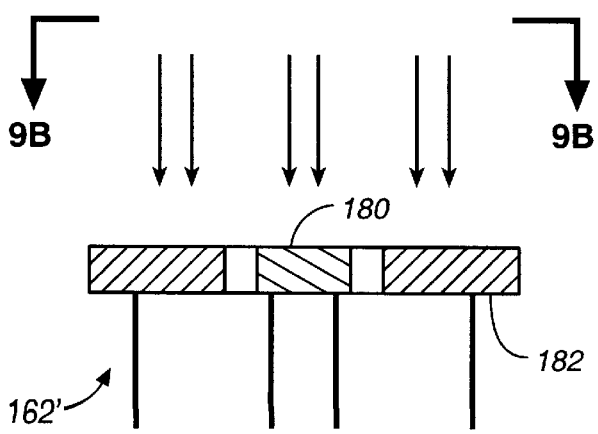
FIG._9A
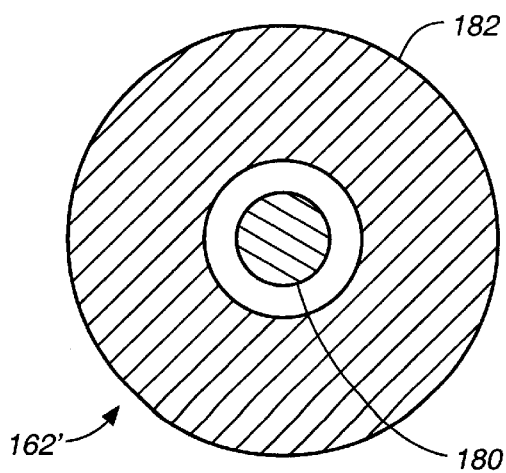
FIG._9B

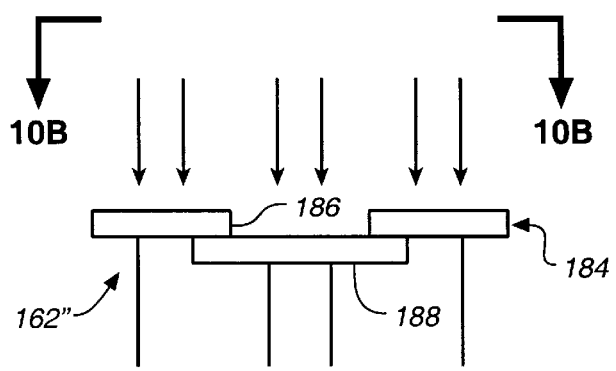
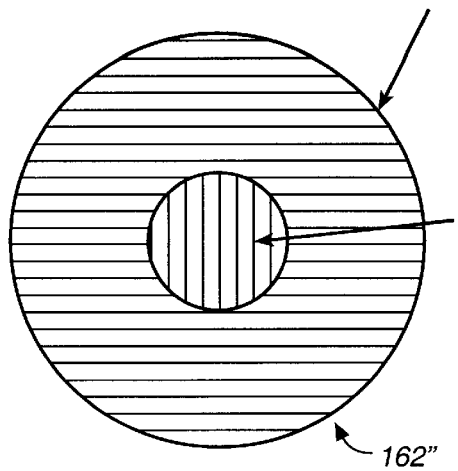
FIG._10A  FIG._10B
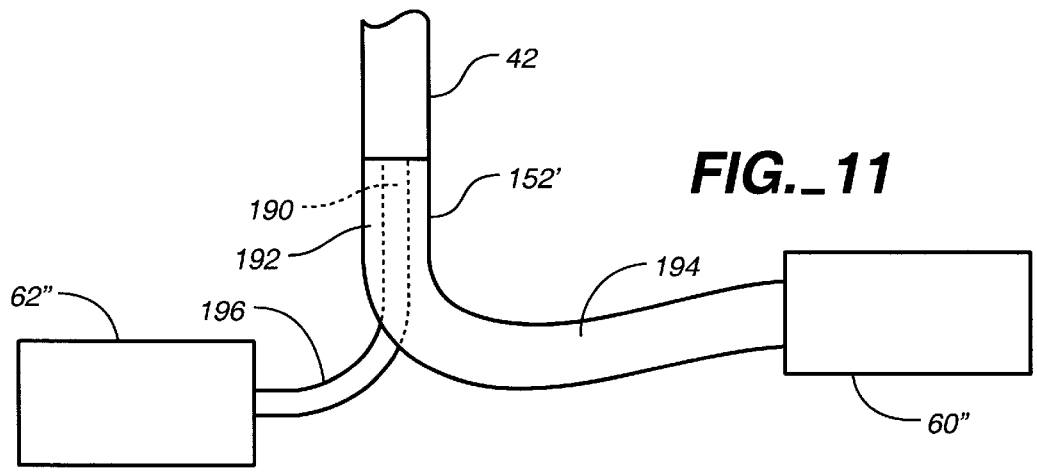
FIG._11
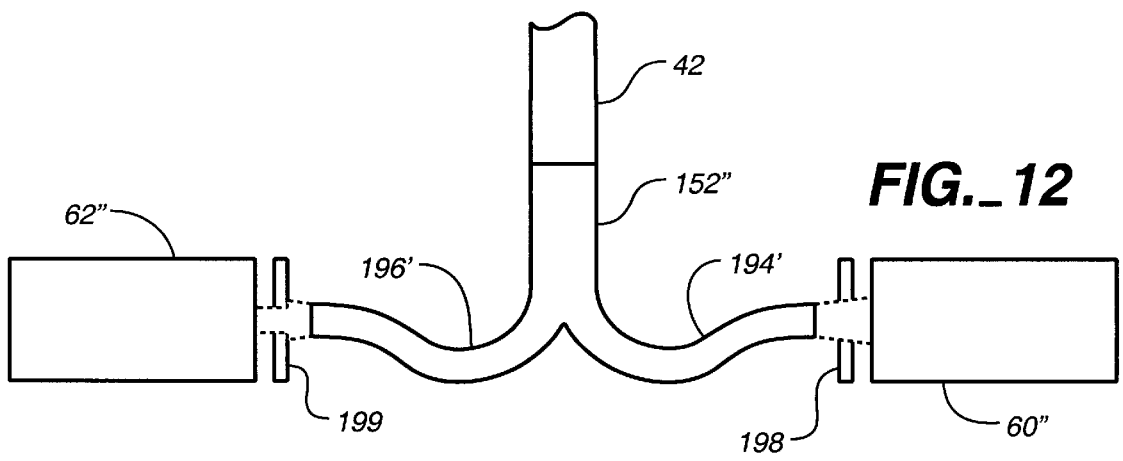
FIG._12

APPARATUS FOR SUBSTRATE TEMPERATURE MEASUREMENT USING A REFLECTING CAVITY AND DETECTOR

CROSS-REFERENCE TO RELATED APPLICATIONS

The present application is a continuation-in-part of U.S. application Ser. No. 09/026,855, now U.S. Pat. No. 6,007,241, filed Feb. 20, 1998, and a continuation-in-part of U.S. application Ser. No. 09/044,217, filed Mar. 18, 1998, each of which are incorporated herein in their entirety.

BACKGROUND

The present invention relates to a temperature sensor for measuring a substrate temperature during thermal processing.

In rapid thermal processing (RTP), a substrate is heated quickly and uniformly to a high temperature, such as 4000 Celsius (C) or more, to perform a fabrication step such as annealing, cleaning, chemical vapor deposition, oxidation, or nitration. For example, a thermal processing system, such as the RTP tool available from Applied Materials, Inc., under the trade name "Centura$^R$", may be used to perform metal annealing at temperatures of 400° C. to 500° C., titanium silicide formation at temperatures around 650° C., or oxidation or implant annealing at temperatures around 1000° C.

The temperature of the substrate must be precisely controlled during these thermal processing steps to obtain high yields and process reliability, particularly given the submicron dimension of current semiconductor devices. For example, to fabricate a dielectric layer 60–80 angstroms (Å) thick with a uniformity of +/−2 Å, a typical requirement in current device structures, the temperature in successive processing runs cannot vary by more than a few ° C. from the target temperature. To achieve this level of temperature control, the temperature of the substrate is measured in real time and in situ.

Optical pyrometry is a technology that is used to measure substrate temperatures in RTP systems. Pyrometry exploits a general property of objects, namely, that objects emit radiation with a particular spectral content and intensity that is characteristic of their temperature. Thus, by measuring the emitted radiation, the object's temperature can be determined. A pyrometer measures the emitted radiation intensity and performs the appropriate conversion to obtain the substrate temperature. The relationship between spectral intensity and temperature depends on the spectral emissivity of the substrate and the ideal blackbody intensity-temperature relationship, given by Planck's law:

$$I_b(\lambda, T) = \frac{2C_1}{\lambda^5 \left( e^{\frac{C_2}{\lambda T}} - 1 \right)} \quad (1)$$

where $C_1$ and $C_2$ are known constants, $\lambda$ is the radiation wavelength of interest, and T is the substrate temperature measured in ° K. The spectral emissivity $\epsilon(\lambda,T)$ of an object is the ratio of its emitted spectral intensity $I(\lambda,T)$ to that of a black body at the same temperature $I_B(\lambda,T)$. That is, $$\epsilon(\lambda, T) = \frac{I(\lambda, T)}{I_b(\lambda, T)} \quad (2)$$

Since $C_1$ and $C_2$ are known constants, under ideal conditions, the temperature of the substrate can be accurately determined if $\epsilon(\lambda,T)$ is known.

The emissivity of a substrate depends on many factors, including the characteristics of the wafer itself (e.g., temperature, surface roughness, doping level of various impurities, material composition and thickness of surface layers), the characteristics of the process chamber, and the process history of the wafer. Therefore, a priori estimation of substrate emissivity cannot provide a general purpose pyrometric temperature measurement capability. Consequently, the emissivity of the substrate needs to be measured in situ. Furthermore, any uncertainty in the measured emissivity introduces an uncertainty into the temperature measurement.

To reduce this uncertainty, several techniques have been developed for reducing the effect of substrate emissivity on the temperature measurement. One such technique involves placing a reflector plate beneath the back surface of a target substrate to form a reflecting cavity. If the reflector plate were an ideal reflector, it can be shown that because all of the radiation emitted from the substrate would be reflected back to the substrate, the reflecting cavity would act as an ideal black body. That is, the intensity of the radiation within the reflecting cavity would not be a function of the emissivity of the surface of the substrate. Thus, in the ideal case, the reflecting cavity increases the effective emissivity of the substrate to a value equal to one.

However, because the reflector plate is not an ideal reflector, the effective emissivity of the substrate will be less than one, although it will be higher than the substrate's actual emissivity. Therefore, the radiation intensity measured by a temperature sensor will still depend upon the emissivity of the substrate. Consequently, although variations in the actual emissivity of the substrate will have less impact on the measured temperature, there will be uncertainty in the temperature measurement.

Moreover, different portions of the substrate may have different emissivities. Consequently, if the emissivity of the substrate is measured in only one region, there will be uncertainty in the temperature measurements of other regions of the substrate.

In addition, the transparency of the substrate contributes to the uncertainty in the temperature measurement. A portion of the radiation intended to heat the substrate may instead pass through the substrate into the pyrometer. Since the pyrometer includes this transmitted radiation in the measured intensity, the transmitted radiation results in an artificially high temperature measurement. Assuming that the substrate is a silicon wafer and the pyrometer is sensitive to infrared radiation, this problem will be more acute at lower processing temperatures (e.g., less than 600° C.), where the transmitivity of silicon to infrared radiation is higher.

Another source of uncertainty is electrical noise. If only a small amount of light enters the pyrometer, the signal-to-noise ratio will be low, and the electrical noise will create uncertainty in the temperature measurement.

Another problem is that there are many thermal processing steps which are not compatible with a highly reflective reflector plate. For example, certain thermal processing steps may be corrosive or destructive to such a reflector plate.

Furthermore, even standard thermal processing may cause the reflector plate to become dirty or corroded over time, and thus less reflective. If the reflector plate's reflectivity decreases, the substrate's effective emissivity also decreases. This change in the substrate's effective emissivity changes the intensity of the radiation sampled by the pyrometer, and can create an error in the measured temperature.

SUMMARY

In one aspect, the invention is directed to a temperature sensor for measuring a temperature of a substrate in a thermal processing chamber, where the chamber includes a reflector forming a reflecting cavity with a substrate when the substrate is positioned in the chamber. The temperature sensor includes a probe having an input end positioned to receive radiation from the reflecting cavity, and a detector optically coupled to an output end of the probe. The radiation entering the probe includes reflected radiation and non-reflected radiation. The detector measures an intensity of a first portion of the radiation entering the probe to generate a first intensity signal and measures an intensity of a second portion of the radiation entering the probe to generate a second intensity signal. The detector is configured so that a ratio of the reflected radiation to the non-reflected radiation is higher in the first portion than the second portion.

Implementations of the invention may include the following. A processor may be coupled to the detector to calculate a substrate temperature and a substrate emissivity from the first and second intensity signals. The second portion of radiation may include a greater proportion of radiation which enters the probe with an axis of propagation within an angle, e.g., between 0 and 10 degrees, of an axis normal to the reflector than the first portion of radiation. The detector may include a first detector surface and a second detector surface, and the first portion of the radiation may impinge the first detector surface and the second portion of the radiation may impinge the second detector surface.

The detector can be configured to preferentially direct radiation that enters the probe with an axis of propagation within an angle of an axis normal to the reflector to the second detector surface, to preferentially direct radiation that enters the probe with an axis of propagation outside an angle of an axis normal to the reflector to the first detector surface, to prevent a portion of the radiation that enters the probe with an axis of propagation within an angle of an axis normal to the reflector from impinging on the first detector surface, or to prevent a portion of the radiation that enters the probe with an axis of propagation outside an angle of an axis normal to the reflector from impinging on the second detector surface.

The detector may include a reflective surface positioned to divide the radiation from the probe into a first beam that is directed to the first detector surface and a second beam that is directed to the second detector surface. A pyrometer filter may be positioned in an optical path between the probe and the reflective surface. The reflective surface may be positioned in a central region of an optical path of the radiation entering the probe. The reflective surface may be partially reflective and partially transparent, and the radiation reflected by the reflective surface may form one of the first and second beams and radiation transmitted by the reflective surface may form the other of the first and second beams. The detector may include an opaque optical element positioned in the outer region of the second beam, or an opaque optical element positioned in the inner portion of the first beam.

The detector may include an array of photosensitive elements, and radiation from a central region of the optical path may impinge a central region of the array and radiation from the outer region of the optical path may impinge an outer region of the array. The detector may include circuitry configured to use signals from the photosensitive elements located in the outer region to generate the first intensity signal and signals from the photosensitive elements located in the central region to generate the second intensity signal. The detector may include a first detector surface positioned to receive the central portion of the radiation and a second detector surface positioned to receive the outer portion of the radiation. For example, the first detector surface may be substantially annular in shape and surround the second detector surface. The detector may include a split optical fiber having a first branch and a second branch, the split optical fiber configured so that the outer portion of the radiation enters the first branch to form a first beam and the central portion of the radiation enters the second branch to form a second beam.

In another aspect, the invention is directed to an apparatus for measuring the temperature of a substrate in a thermal processing chamber. The apparatus includes a reflector located to form a reflecting cavity with a substrate when the substrate is positioned in the chamber, a temperature sensor including a probe and a detector to generate first and second intensity signals, and a processor coupled to the detector to calculate a substrate temperature from the first and second intensity signals. The probe has an input end positioned to receive radiation from the reflecting cavity, and an output end optically coupled to the detector. The detector measures an intensity of a first portion of the radiation entering the probe to generate the first intensity signal and measures an intensity of a second portion of the radiation entering the probe to generate the second intensity signal. The radiation entering the probe includes reflected radiation and non-reflected radiation, and the temperature sensor is configured so that a ratio of the reflected radiation to the non-reflected radiation is higher in the first portion than the second portion.

In another aspect, the invention is directed to an apparatus for measuring the temperature of a substrate in a thermal processing chamber. The apparatus includes a reflector located to form a reflecting cavity with a substrate when the substrate is positioned in the chamber, a temperature sensor including a probe having an input end positioned to receive radiation from the reflecting cavity, means for directing a first portion of the radiation from an output end of the probe to a first detector and directing a second portion of the radiation from the output end of the probe to a second detector, and a processor coupled to the first and second detectors to calculate a substrate temperature from a first intensity signal from the first detector and a second intensity signal from the second detector. The radiation entering the probe including reflected radiation and non-reflected radiation, and the directing means is configured so that a ratio of reflected radiation to non-reflected radiation is higher in the first portion than the second portion.

In another aspect, the invention is directed to an apparatus including a reflective collimator having an input aperture to receive radiation from a probe, a reflective concentrator having an input aperture positioned to receive radiation from an output aperture of the reflective collimator, a filter positioned between the output aperture of the reflective collimator and the input aperture of the reflective concentrator, a first detector positioned to receive radiation from an output aperture of the reflective concentrator and generate a first intensity signal, a second detector to generate a second intensity signal, and a reflective surface positioned in the optical path of the radiation passing through the reflective concentrator to direct a portion of the radiation to the second detector.

Implementations of the invention may include the following. A processor may be connected to the first and second detectors to determine a temperature measurement from the first and second intensity signals. Either or both the collimator and the concentrator may be a $\theta_{in}/\theta_{out}$ device.

In another aspect, the invention is directed to a method of measuring the temperature of a substrate in a thermal processing chamber. In the method, a substrate is positioned in a thermal processing chamber to form a reflecting cavity with a reflector located in the chamber. Radiation is sampled from the cavity with a probe and the sampled radiation is directed to a detector. The sampled radiation includes reflected and non-reflected radiation. A first intensity signal is generated for a first portion of the sampled radiation with the detector, and a second intensity signal is generated for a second portion of the sampled radiation with the detector, wherein a ratio of the non-reflected radiation to the reflected radiation is higher in the first portion than the second portion. A temperature of the substrate is determined from the first and second intensity signals.

Implementations of the invention may include the following. An emissivity of the substrate may be determined from the first and second intensity signals. The radiation may be divided into a first beam which is directed to a first detector surface and a second beam which is directed to a second detector surface.

Advantages of the invention may include the following. The temperature may be calculated using the measured emissivity to generate a more accurate temperature measurement. Furthermore, the emissivity measurements may be performed without introducing additional probes into the processing chamber. The actual emissivity of the substrate has less effect on the temperature measured by the temperature sensor. The emissivity of the substrate may be measured at multiple locations. The effect of radiation transmitted through the substrate is reduced, and the signal-to-noise ration is increased, thereby decreasing the uncertainty in the temperature measurement. A partially reflective (e.g., as low as 50% reflectivity) reflector plate may be used to create a virtual black body cavity. This permits the reflector plate to be made from less expensive materials. It also permits the reflector plate to be made of materials which are more compatible with the more destructive or corrosive thermal processes.

Other features and advantages of the invention will be apparent from the following description, including the drawings and the claims.

BRIEF DESCRIPTION OF THE DRAWINGS

FIG. 1 is a schematic cross-sectional view of a rapid thermal processing system.

FIG. 2 is a schematic diagram of a virtual black body cavity showing ray-traces of light rays entering the temperature sensor.

FIG. 3 is a schematic cross-sectional view of a detector apparatus according to the present invention.

FIG. 4 is a schematic perspective view of a collimator of the temperature sensor of FIG. 3.

FIG. 5 is a flow chart illustrating the steps of calculating a substrate temperature.

FIG. 6 is a schematic cross-sectional view of a detector apparatus including a beam splitter.

FIG. 7 is a schematic cross-sectional view of a temperature sensor including a photodetector.

FIG. 8A is a schematic side view of the internal components of a pyrometer including a photodetector with an array of photodiodes.

FIG. 8B is a view along line 8B—8B of FIG. 8A.

FIG. 9A is a schematic cross-sectional view of a photodetector having inner and outer detector elements.

FIG. 9B is a view along line 9B—9B of FIG. 9A.

FIG. 10A is a schematic cross-sectional view of a photodetector having upper and lower detector elements.

FIG. 10B is a view along line 10B—10B of FIG. 9A.

FIG. 11 is a schematic view of a temperature sensor using a split optical fiber.

FIG. 12 is a schematic view of a temperature sensor using a split optical fiber and different numerical apertures.

Like reference numbers are designated in the various drawings to indicate like elements. A primed reference number indicates that an element has a modified function, operation or structure.

DETAILED DESCRIPTION

In the following description, the term "substrate" broadly covers any object that is being processed in a thermal processing chamber. The term "substrate" includes, for example, semiconductor wafers, flat panel displays, glass plates or disks, and plastic workpieces.

Referring to FIG. 1, an RTP system 10 includes a processing chamber 12 for processing, for example, an eight inch (200 mm) or twelve inch (300 mm) diameter disk-shaped substrate 14. A description of such an RTP system may be found in U.S. Pat. No. 5,660,472, the entire disclosure of which is incorporated herein by reference.

Substrate 14 is rapidly and evenly heated inside chamber 12 to an elevated temperature (e.g., between about 400 and 1000° C.) and may be subjected to various processing steps such as annealing, cleaning, chemical vapor deposition, etching, oxidation, or nitration. Substrate 14 is supported by a rotating support ring 16 above a reflector 20 that is mounted on a base 26. The base may be made of stainless steel. A coolant circulates through passages 28 in base 26 to control the temperature of the base and the reflector.

The reflector 20 may include an aluminum body 22 coated with a partially or highly reflective layer 24. The reflective layer 24 may be formed from a highly reflective material, such as gold or rhodium. Gold has a reflectivity of about 0.975 in the infrared wavelength range of interest, i.e., about 900–1000 nanometers (nm), whereas rhodium has a reflectivity of about 0.8. To further enhance the reflectivity of the reflector, a quarterwave stack may be formed on the gold layer. However, due to the increased effective emissivity in the embodiments described below, a partially reflective reflector may be used. For example, the reflectivity of reflector 20 in the wavelength range of interest may be in the range of 0.5 to 0.95. This permits other materials, such as nickel, aluminum or rhodium, to be used for reflective layer 24. In fact, reflective layer 24 may be eliminated entirely so that the body 22 acts as the reflector. This reduces the cost of reflector 20 and permits the RTP system to be used in a wider variety of fabrication processes.

Substrate 14 is heated by a heating element 30 (e.g., a water-cooled array of tungsten-halogen lamps). Radiant energy from heating element 30 passes through a window 32, located directly above the substrate, to rapidly and uniformly heat the substrate to an elevated temperature. The heating element and window may be constructed as described in U.S. Pat. No. 5,155,336, the entire disclosure of which is incorporated herein by reference. The underside of substrate 14 and the top of reflector 20 form a reflecting cavity 34 which makes the substrate appear more like an ideal black body. That is, the reflector increases the effective emissivity of the substrate.

A plurality of temperature sensors or pyrometers 40 (e.g., eight, although only three are shown in FIG. 1) are positioned to measure the substrate's temperature at different substrate radii during the processing operation. Each temperature sensor 40 includes a probe 42 to sample radiation from the cavity, and a detector apparatus 50 to measure the intensity of the sampled radiation and convert the measured intensity into a temperature measurement.

Referring to FIG. 2, the input end of probe 42 is located near (e.g., flush with) the top of reflector 20 to sample radiation from reflecting cavity 34. The radiation entering probe 42 is made up of many components, including components emitted directly from the substrate and reflected components. For example, the radiation indicated by ray R includes one component emitted directly from the substrate (from point A) which has experienced no reflections; a second component (from point B and reflected at point A) which has experienced one reflection off reflector 20 and the backside of substrate 12; a third component (from point C and reflected at points A and B) which has experienced two reflections off reflector 20 and the backside of substrate 12; etc. Thus, the total intensity $I_T$ of radiation sampled by probe 42 can be found by summing over an infinite series of components of impinging radiation as follows:

$$I_T = \epsilon_S \cdot I_b \cdot \sum_n R^n \cdot (1-\epsilon_S)^n \quad (3)$$

which reduces to (as n goes to infinity):

$$I_T = \frac{\epsilon_S \cdot I_b}{1 - R(1 - \epsilon_S)} \quad (4)$$

where R is the reflectivity of the reflector, $\epsilon_S$ is the actual emissivity of the substrate, and $I_b$ is the radiation from an ideal blackbody at the wavelength range of interest.

The intensity, $I_D$, of the radiation emitted directly by the substrate, i.e., not including any reflected components, would be given by the following equation:

$$I_D = \epsilon_S I_b \quad (5)$$

where $I_b$ and $\epsilon_S$ have the meanings given for Equation (4). In contrast, the reflector 20 increases the effective emissivity, $\epsilon_A$, of the substrate so that:

$$I_T = \epsilon_A I_b \quad (6)$$

where $$\epsilon_A = \frac{\epsilon_S}{1 - R(1 - \epsilon_S)} \quad (7)$$

and $I_b$ and $\epsilon_S$ again have the meanings given for Equation (4). Assuming that the reflectivity of the reflector is equal to one (R=1), Equation (4) reduces to:

$$I_T = I_b$$

in which the radiation intensity $I_T$ is independent of emissivity of the backside of the substrate. Thus, in an ideal system, the sampled radiation intensity $I_T$ could be converted by the pyrometer into a measured temperature by using Equation (1).

Unfortunately, the presence of probe 42 introduces a localized disturbance in the virtual blackbody effect in reflector cavity 34. The size of the disturbance tends to increase with increasing size (D) of the aperture in the reflector which accommodates the probe. This disturbance counteracts the emissivity-enhancing effect produced by the reflector. Thus, this localized disturbance in the virtual blackbody cavity reduces the effective emissivity of substrate 12 in a region directly above the probe. In contrast, the effective emissivity of the remainder of the substrate remains substantially unaffected by the disturbance.

Without being limited to any particular theory, one possible cause of the disturbance is that the probe aperture acts as an energy sink. The effect may be explained by assuming that the substrate is perfectly specular and considering the radiation entering the probe at a specific point (e.g., point P). The portion of this radiation which enters the probe within an angle φ consists entirely of radiation emitted directly by the substrate (e.g., from point A'). This portion does not contain any reflected components. This is because radiation which would otherwise constitute one of the reflected components (e.g., radiation from point B') will enter probe 42 rather than be reflected off reflector 20. Since the radiation within the angle 0 consists entirely of radiation emitted directly from the substrate, without any reflections, there is no emissivity-enhancing effect in the region of the substrate directly above the probe. In short, the probe itself creates an area where radiation is not reflected, thus lowering the effective emissivity of the substrate. Although the localized disturbance is most easily explained for a specular substrate, the effect also occurs in diffuse substrates.

As will be described in greater detail below, each temperature sensor 40 compensates for the fact the reflector is not perfectly reflective and for the local distortion in the virtual black body effect caused by the probe. Specifically, the temperature sensor may make two intensity measurements. One measurement uses proportionally more reflected radiation and less direct radiation than the other. That is, the ratio of reflected to non-reflected radiation is higher in the portion of the radiation used for the first intensity measurement than in the portion of the radiation used for the second intensity measurement. The temperature sensor 40 uses the two intensity measurements to determine the emissivity and temperature of the substrate.

The temperature sensor can reduce the amount of non-reflected light used in one of the intensity measurements by substantially excluding or ignoring radiation entering the probe from angles which are nearly normal to the reflector. By either preventing the radiation within a central angle a (measured as an angle between the axis of propagation of the radiation and an axis normal to reflector) from reaching the photodetector in the temperature sensor, or by not processing this radiation, the temperature sensor can use more reflected radiation. Thus, the substrate has a higher effective emissivity to at least one of the intensity measurements due to the virtual blackbody cavity effect. The central angle α may be about the same as the angle φ. The central angle a may be between about 0° and 10°, such as between about 3° and 8°; e.g., it may be approximately 5°. Assuming the central angle α is fairly small, e.g., less than 10°, the radiation within this angle may be considered to be substantially normal to the reflector surface. This corresponds to the area of lowered effective emissivity directly over the probe.

Referring to FIGS. 1 and 3, the probe may be a light pipe 42 which extends through a conduit 44 from the backside of base 26 and into an aperture in reflector 20. The light pipe may be a quartz or sapphire tube about 0.05 to 0.20 inches, e.g., about 4 millimeters, in diameter. A portion of light pipe 42, e.g., a portion extending through conduit 44 to detector apparatus 50, may be surrounded by a protective sheath 45. A mounting bracket 46 having threaded cylindrical surfaces 47 may be screwed into a threaded receiving portion of conduit 44 to secure the light pipe and the sheath to the base. An O-ring 48 may be compressed between protective sheath 45 and base 26 to seal processing chamber 12 from the external atmosphere.

The output end of light pipe 42 is optically coupled to detector apparatus 50. Detector apparatus 50 includes a housing 52 which holds a collimator 54, a pyrometer filter 56, a concentrator 58, two photodetectors, including a primary photodetector 60 and a secondary photodetector 62, and a reflector 64. The output signals from the primary and secondary photodetectors are input to pyrometer electronics 94, such as a programmable microprocessor, which converts the output signals into a temperature reading. The temperature reading from pyrometer electronics 94 may be used by a controller (not shown) to dynamically control the power to heating element 30 to correct for any deviations from a predefined temperature cycle.

An entrance aperture 66 of collimator 54 has the same diameter and is aligned with the output end of light pipe 42, whereas an exit aperture 68 of collimator 54 is positioned adjacent filter 56. Radiation from light pipe 42 passes through collimator 54 so that it is substantially collimated (e.g., within an acceptance angle of about 15°) when it passes through filter 56.

Collimator 54 should be a high efficiency reflective device, such as a $\theta_{in}/\theta_{out}$ device. Referring to FIG. 4, a $\theta_{in}/\theta_{out}$ device has a highly reflective inner surface 70 which is divided into a conic section 72 located adjacent the output end of light pipe 42, and a parabolic section 74 located between the conic section and the filter. Radiation incident on the entrance aperture of the concentrator at angles less than an acceptance angle emerge from the exit aperture at angles less than an output angle. The acceptance and output angles are measured with respect to the primary axis of the concentrator.

Another sort of collimator, such as a compound parabolic cone (CPC) or a lens system, could be used. Alternately, collimator 54 can be eliminated entirely if filter 56 has a sufficiently high acceptance angle. However, if a collimator is used, $\theta_{in}/\theta_{out}$ device is preferred because it provides high efficiency and good spatial uniformity.

Returning to FIG. 3, filter 56 may have a narrow bandwidth, e.g., about 40 nm, located entirely below the bandgap of silicon, i.e., less than about 950 nanometers. For example, the bandwidth of the filter may be centered at about 900 nanometers. In addition, the filter should have extremely low transmitivity at wavelengths within the bandgap of silicon. This prevents radiation which is transmitted through the substrate from interfering with the temperature measurement.

Filter 56 is positioned across an entrance aperture 76 of concentrator 58, and primary photodetector 60 is positioned adjacent an exit aperture 78 of the concentrator. The filtered radiation is focused by concentrator 58 onto a small area on primary photodetector 60. Preferably, concentrator 58 is also a $\theta_{in}/\theta_{out}$ device, although it may also be a CPC or a lens system.

If the concentrator is a $\theta_{in}/\theta_{out}$ device, it may have an acceptance angle, the angle from an axis normal to the reflector surface, within which it will concentrate radiation. Radiation entering light pipe 42 within the acceptance angle will pass through the concentrator, whereas radiation entering light pipe 42 from outside the acceptance angle will be reflected. The acceptance angle should be selected to prevent the temperature probes from sampling the same region of the substrate, while collecting as much radiation as possible. The acceptance angle may be about 40°.

A gold plated pin 80 may extend through an aperture 84 in the side of the concentrator and into the radiation path between filter 56 and primary photodetector 60. A planar surface 82 at the end of pin 80 forms reflector 64. A second aperture 86 may be formed in the side of concentrator 58 opposite pin 80. Reflector 64 is positioned to deflect a central portion 90 (indicated by the dashed lines) of the radiation from light pipe 42 through second aperture 86 to impinge secondary photodetector 62. The remainder of the radiation, i.e., the outer portion 92 not reflected by reflector 64, passes around pin 80 and is directed by concentrator 58 onto primary photodetector 60. The photodetectors 60 and 62 may be secured to concentrator 58 by screws 88.

Since the non-reflected radiation from the substrate enters light pipe 42 at low angles of incidence, this radiation will form a higher proportion of central radiation portion 90 than the outer radiation portion 92. Consequently, the radiation impinging secondary photodetector 62 contains a higher proportion of non-reflected light than the radiation impinging primary photodetector 60. Since the proportions of reflected and non-reflected light are different for primary photodetector 60 and secondary photodetector 62, the substrate will exhibit different effective emissivities to the detectors, and the detectors will generate different intensity measurements. However, because the radiation impinging the two detectors still contains multiple components, the expression for the measured intensity given by Equation (7) remains generally accurate. Thus, the intensity $I_1$ measured by the primary photodetector is given the following equation:

$$I_1 = \epsilon_1 I_b(T) \tag{9}$$
$$= \epsilon_S I_b(T) \cdot \frac{1}{1 - P_1(1 - \epsilon_S)}$$

and the intensity $I_2$ measured by the secondary photodetector is given by the following equation:

$$I_2 = \epsilon_2 I_B(T) \tag{10}$$
$$= \epsilon_S I_B(T) \cdot \frac{1}{1 - P_2(1 - \epsilon_S)}$$

where $\epsilon_1$ and $\epsilon_2$ represent the effective emissivities of the primary and secondary photodetectors, and $P_1$ and $P_2$ represent the effective reflectivities of the reflector plate to the first and second detectors.

The effective reflectivities $P_1$ and $P_2$ are system constants determined by the configuration of the temperature sensor 40 (e.g., the size of reflector 64), the actual reflectivity of reflector 20, and the configuration of reflecting cavity 34 (e.g., the distance between the reflector and the underside of the substrate). In order to calibrate the temperature sensors and determine the effective reflectivities $P_1$ and $P_2$, a substrate having a known emissivity may be processed in RTP system 10. The results of thermal processing have a well defined relationship to the substrate temperature. For example, as discussed in the aforementioned U.S. Pat. No. 5,660,472, the temperature T of a substrate may be deduced from the thickness of an oxide layer formed thereon during thermal processing. The effective reflectivities $P_1$ and $P_2$ may then be calculated from the measured intensities $I_1$ and $I_2$, the actual emissivity Es Of the substrate, the substrate temperature T, and the blackbody relationship.

Once the effective reflectivities $P_1$ and $P_2$ are known, temperature sensor 40 may be used to determine the temperature of a substrate having an arbitrary emissivity.

Specifically, given the measured values $I_1$ and $I_2$, and the known effective reflectivities $P_1$ and $P_2$, Equations (9) and (10) may be solved to calculate the substrate emissivity Es and the blackbody intensity $I_B$. Finally, an exact solution for the substrate temperature T may be calculated from the blackbody intensity $I_B$ according to the ideal blackbody relationship of Equation (1).

Referring to FIG. 5, instead of an exact solution, the substrate temperature may be calculated according to a simplified approximation, substantially as discussed in the aforementioned U.S. Pat. No. 5,660,472. First, the intensity measurements $I_1$ and $I_2$ are converted into temperature measurements $T_1$ and $T_2$, respectively (step 102). Assuming that emissivity correction has been enabled (step 104), and that the first temperature measurement $T_1$ is greater than a trigger level (step 106), the difference between the two temperature measurements is calculated, i.e., $dT=T_1-T_2$ (step 108). A running average of a temperature difference dT may be calculated from, for example, the five previous data points (step 110). This running average reduces the effects of electrical noise and spurious signals on the temperature measurement. Next, an initial wafer emissivity $E_i$ is calculated (step 112) according to the following equation:

$$E_i = 1 - \frac{K_1 dT}{1 + et_1(T_1 - 1100)} \quad (11)$$

where $K_1$ is an emissivity to dT ratio which is specific to the chamber, and $et_1$ is an emissivity temperature coefficient which is specific to the system. The system constants $K_1$ and $et_1$ may be determined in the same fashion that the effective reflectivity $P_1$ and $P_2$ are determined; that is, a substrate having a known emissivity is processed and the substrate temperature is deduced from the process results. If the initial wafer emissivity $E_i$ is greater than 1.0 (step 114) then it may be set to 1.0 (step 116), whereas if $E_i$ is less than 0.1 (step 118) then it may be set to 0.1 (step 120). Next, an enhanced wafer emissivity $E_A$ may be calculated (step 122) from the following equation:

$$E_A = \frac{E_i}{1 - P_C(1 - E_i)} \quad (12)$$

where $P_C$ is an emissivity plate enhancement multiplier which is specific to the chamber. If the enhanced emissivity EA is greater than 1.0 (step 124) then it may be set to 1.0 (step 126), whereas if EA is less than 0.5 (step 128) then it may be set to 0.5 (step 130). Finally, a corrected temperature $T_C$ is calculated (step 132) according to the following equation:

$$T_C = \frac{c2}{\lambda \ln(E_A) + \frac{c2}{T_1 + 273}} - 273 \quad (13)$$

where $\lambda$ is the radiation wavelength of interest and $c_2$ is a known physical constant.

Since each temperature sensor 40 corrects for the substrate emissivity, uncertainty in the temperature measurement created by variations in the emissivity across the substrate is reduced. In addition, the emissivity correction may be performed by each probe, without the introduction of additional probes into the processing chamber. Since the $\theta_{in}/\theta_{out}$ devices used for the collimator and concentrator have a very high efficiency, little light is lost in the optical path between the chamber and the detector, thereby increasing the signal strength and reducing the signal to noise ratio. Furthermore, because the pyrometer filter excludes radiation of wavelengths at which the silicon substrate is transparent, radiation from the heating element does not interfere with the temperature measurement. In addition, since reflector 64 prevents a significant portion of the non-reflected radiation from reaching the primary photodetector, the substrate has a higher effective emissivity to the primary photodetector. Therefore, the primary photodetector can generate a more accurate temperature measurement, even at lower processing temperatures.

Other configurations and arrangements are possible for the detector apparatus. For example, referring to FIG. 6, detector apparatus 50' includes an optical splitter 140 to divide radiation from filter 56 into a primary beam 142 and a secondary beam 144. Optical splitter 140 may be a split optical fiber or a device which is partially reflective and partially transmissive (on occasion referred to simply as "partially reflective"), such as partially silvered mirror or a polarizing beam splitter. Primary beam 142 is directed to primary photodetector 60', whereas secondary beam 144 is directed to secondary photodetector 62'. An opaque element 146 having an aperture 148 is positioned in front of secondary photodetector 62' so that only the central portion of the secondary beam impinges the secondary photodetector. In contrast, the entire primary beam 142 may impinge the primary photodetector, or alternately, an opaque optical element 149 may be positioned in front of the primary photodetector so that only the annular outer portion of the primary beam impinges the primary photodetector. Since the radiation which impinges secondary photodetector 62 has a greater proportion of non-reflected light than the radiation which impinges primary photodetector 60', the substrate will exhibit different effective emissivities to the two detectors. Consequently, the primary and secondary photodetectors generate intensity signals $I_1$ and $I_2$ which may be used to calculate the emissivity and temperature of the substrate as discussed above. A similar result may be achieved simply by using different numerical apertures in front of the primary and secondary photodetectors. In addition, the optional opaque optical element 149 will prevent a substantial portion of the non-reflected radiation from entering the primary photodetector, and consequently the primary photodetector will generate a more accurate temperature measurement.

Referring to FIG. 7, in another embodiment, the output end of the light pipe is optically coupled to (e.g., held in close contact with) a flexible fiber optic guide 152. Fiber optic guide 152 and light pipe 42 may be coupled by a threaded connector 154. Sampled radiation passes down light pipe 42, through fiber optic guide 152, and into a detector apparatus 150, such as a pyrometer. The pyrometer computes the temperature of substrate 14 from the intensity of the radiation sampled by light pipe 42.

Inside pyrometer box 150, radiation from fiber optic guide 152 passes through a collimating lens 156 to form a radiation beam 158. The radiation beam 158 passes through an optical pyrometer filter 160 before impinging a photodetector 162. The signal from photodetector 162 is input to control electronics 164 which convert that signal to a temperature reading.

Referring to FIG. 8A, as previously discussed, the radiation transmitted by fiber optic guide 152 passes through lens 156 before reaching photodetector 162. Because the fiber optic guide and radiation pipe operate by total internal reflection, the distribution of input angles at the input end of the radiation pipe is preserved at its output end. Therefore, the radiation which entered light pipe 42 within central angle α will exit fiber optic guide 152 within the same angle α. This radiation is collimated by lens 156 to form a central portion 166 of beam 158. The radiation entering light pipe 42 at an angle between an acceptance angle (defined by the numerical aperture of lens 156) and the central angle a forms an outer portion 168 of beam 158. The central portion 166 of beam 158 strikes a central area 170 of photodetector, whereas outer portion 168 of beam 158 strikes an outer area 172 of the photodetector.

In one implementation, photodetector 162 is a charged coupled device (CCD) or a similar multi-element detector. Referring to FIG. 8B, photodetector 162 will include some detector elements 174a, such as photodiodes, associated with central area 170, and some detector elements 174b, possibly also photodiodes, associated with outer area 172. Control electronics 164 may be configured (e.g., by software control) to use the output signals of detector elements 174b to calculate a primary intensity signal $I_1$, and use the output signals of inner detector elements 174a to calculate a secondary intensity signal $I_2$. The two intensity signals $I_1$ and $I_2$ may be used as described above in reference to FIGS. 3–5 to calculate the emissivity and temperature of the substrate.

Referring to FIGS. 9A and 9B, in another embodiment, photodetector 162' includes a central inner detector 180 and an annular outer detector 182. The central portion 166 of beam 158 strikes inner detector 180, whereas outer portion 168 of the beam strikes outer detector 182. The outer detector 182 may be used as the primary photodetector to generate a first intensity signal $I_1$ and the inner detector 180 may be used as the secondary photodetector to generate a second intensity signal $I_2$. The two intensity signals may be used to calculate the emissivity and temperature of the substrate.

Referring to FIGS. 10A and 10B, in yet another embodiment, photodetector 162" may be formed from an upper detector 184 having an aperture 186 and a lower detector 188. The outer portion 168 of radiation beam 158 impinges upper detector 184, whereas central portion 166 of the radiation beam passes through aperture 186 and impinges lower detector 188. The upper detector 184 may be used as the primary photodetector to generate a first intensity signal $I_1$, and the lower detector 188 may be used as the secondary photodetector to generate a second intensity signal $I_2$. The output signals of the two detectors may be used to calculate the substrate emissivity and temperature.

Referring to FIG. 11, in another embodiment, fiber optic guide 152' may be a split fiber optic bundle with a first branch 194 and a second branch 196. The portion of fiber optic guide 152' adjacent to the output end of light pipe 42 includes a central portion 190 and an outer portion 192. The first branch 194 includes the optical fibers from outer portion 192, whereas the second branch includes the optical fibers from central portion 190. The first branch 194 is directed to primary photodetector 60" whereas second branch 196 is directed to a secondary photodetector 62". Therefore, radiation within angle α will enter the first branch, whereas radiation outside angle α will enter the second branch. As a result, radiation within angle α does not reach the primary photodetector, and the effective emissivity of the substrate is increased to that detector. The output signals from the primary and secondary photodetectors may be used to calculate the emissivity and temperature of the substrate.

Referring to FIG. 12, in yet another embodiment, fiber optic guide 152" may be a split fiber optic bundle with a first branch 194' and a second branch 196'. The two branches 194' and 196' may sample portions of the radiation having substantially similar radial distributions. Radiation from first branch 194' is directed through a first numerical aperture 198 to primary photodetector 60", whereas radiation from second branch 196' is directed through a second, smaller numerical aperture 199 to secondary photodetector 62". Since the numerical apertures are different, the two photodetectors will have different acceptance angles. Specifically, the secondary photodetector 62" will have a narrower acceptance angle than primary photodetector 60". As a result, the secondary photodetector will collect more radiation from the area of the substrate directly above the probe. Therefore, the second photodetector uses more non-reflected radiation than the primary photodetector, and the effective emissivity of the substrate will be different for the two detectors. The output signals from the primary and secondary photodetectors may be used to calculate the emissivity and temperature of the substrate.

The temperature calculation may be performed without emissivity correction. For example, the control electronics may be connected only to the photodetector element or elements (e.g., primary photodetector 60, detector elements 174b, inner detector 180, lower detector 188, or primary photodetector 60") that measure the intensity of the outer portion of the radiation beam. Alternately, the control electronics may be configured to ignore the output signal of the photodetector element or elements (e.g., secondary photodetector 62, detector elements 174a, outer detector 182, upper detector 184, or secondary photodetector 62") that measure the intensity of the inner portion of radiation beam. In either case, the temperature sensor uses less direct radiation and more reflected radiation, and the effective emissivity of the substrate is increased, thereby providing a more accurate temperature measurement. In the embodiment of FIG. 11, if no emissivity correction is to be made, the secondary photodetector 62" may be replaced by a reflector.

The invention is not limited to the embodiments depicted and described. Rather, the scope of the invention is defined by the appended claims.

What is claimed is:

1. A temperature sensor for measuring a temperature of a substrate in a thermal processing chamber, the chamber including a reflecting cavity with a substrate when the substrate is positioned in the chamber, the temperature sensor comprising:

a probe having an input end positioned to receive radiation from the reflecting cavity, wherein the radiation entering the probe includes reflected radiation emitted by the substrate and reflected by the reflector and non-reflected radiation emitted by the substrate and not reflected by the reflector; and a detector optically coupled to an output end of the probe, wherein the detector measures an intensity of a first portion of the radiation entering the probe to generate a first intensity signal and measures an intensity of a second portion of the radiation entering the probe to generate a second intensity signal, the detector being configured so that a ratio of the reflected radiation to the non-reflected radiation is higher in the first portion than the second portion.

2. The temperature sensor of claim 1, further comprising a processor coupled to the detector to calculate a substrate temperature from the first and second intensity signals.

3. The temperature sensor of claim 2, wherein the processor is configured to calculate a substrate emissivity from the first and second intensity signals.

4. The temperature sensor of claim 1, wherein the detector is configured so that the second portion of radiation includes a greater proportion of radiation which enters the probe with an axis of propagation within an angle of an axis normal to the reflector than the first portion of radiation.

5. The apparatus of claim 4, wherein the angle is between about 0 and 10 degrees.

6. The apparatus of claim 1, wherein the detector includes a first detector surface and a second detector surface, and the first portion of the radiation impinges the first detector surface and the second portion of the radiation impinges the second detector surface.

7. The temperature sensor of claim 6, wherein the detector is configured to preferentially direct radiation that enters the probe with an axis of propagation within an angle of an axis normal to the reflector to the second detector surface.

8. The temperature sensor of claim 6, wherein the detector is configured to preferentially direct radiation that enters the probe with an axis of propagation outside an angle of an axis normal to the reflector to the first detector surface.

9. The temperature sensor of claim 6, wherein the detector is configured to prevent a portion of the radiation that enters the probe with an axis of propagation within an angle of an axis normal to the reflector from impinging on the first detector surface.

10. The temperature sensor of claim 6, wherein the detector is configured to prevent a portion of the radiation that enters the probe with an axis of propagation outside an angle of an axis normal to the reflector from impinging on the second detector surface.

11. The temperature sensor of claim 6, wherein the detector includes a reflective surface positioned to divide the radiation from the probe into a first beam that is directed to the first detector surface and a second beam that is directed to the second detector surface.

12. The temperature sensor of claim 11, wherein the detector includes a pyrometer filter positioned in an optical path between the probe and the reflective surface.

13. The temperature sensor of claim 11, wherein the reflective surface is positioned in a central region of an optical path of the radiation entering the probe, wherein the central region of the optical path provides the second portion of radiation, and an outer region of the optical path surrounding the central region provides the first portion of radiation.

14. The temperature sensor of claim 11, wherein the reflective surface is partially reflective and partially transparent, and the radiation reflected by the reflective surface forms one of the first and second beams and radiation transmitted by the reflective surface forms the other of the first and second beams.

15. The temperature sensor of claim 14, wherein the first beam includes a central region and an outer region, the central region containing a higher proportion of radiation which enters the probe with an axis of propagation within an angle of an axis normal to the reflector than the outer region, and the detector includes an opaque optical element positioned in the outer region.

16. The temperature sensor of claim 14, wherein the second beam includes a central region and an outer region, the central region containing a higher proportion of radiation which enters the probe with an axis of propagation within an angle of an axis normal to the reflector than the outer region, and the detector includes an opaque optical element positioned in the inner region.

17. The temperature sensor of claim 1, wherein an optical path of the radiation from the probe includes a central region and an outer region, the central region containing a higher proportion of radiation which enters the probe with an axis of propagation within an angle of an axis normal to the reflector than the outer region.

18. The temperature sensor of claim 17, wherein the detector includes an array of photosensitive elements, and radiation from the central region of the optical path impinges a central region of the array and radiation from the outer region of the optical path impinges an outer region of the array, and the detector includes circuitry configured to use signals from the photosensitive elements located in the outer region of the array to generate the first intensity signal and signals from the photosensitive elements located in the inner region to generate the second intensity signal.

19. The temperature sensor of claim 17, wherein the detector includes a first detector surface positioned to receive radiation from the central region of the optical path and a second detector surface positioned to receive radiation from the outer region of the optical path.

20. The temperature sensor of claim 19, wherein the first detector surface is substantially annular in shape and surrounds the second detector surface.

21. The temperature sensor of claim 17, wherein the detector includes a split optical fiber having a first branch and a second branch, the split optical fiber configured so that radiation from the outer portion of the optical path enters the first branch to form a first beam and radiation from the central portion of the [radiation] optical path enters the second branch to form a second beam.

22. A temperature sensor for measuring a temperature of a substrate in a thermal processing chamber, the chamber including a reflector forming a reflecting cavity with a substrate when the substrate is positioned in the chamber, the temperature sensor comprising:

a probe having an input end positioned to receive radiation from the reflecting cavity, wherein radiation entering the probe includes reflected radiation emitted by the substrate and reflected by the reflector and non-reflected radiation emitted by the substrate and not reflected by the reflector, and wherein radiation exiting an output end of the probe includes a central portion and an outer portion;

a reflective surface positioned to divide the radiation from the output end of the probe into a first beam containing the outer portion of the radiation and a second beam containing the central portion of the radiation, with a ratio of the reflected radiation to the non-reflected radiation being higher in the first beam than the second beam;

a first detector to measure an intensity of the first beam to generate a first intensity signal; and a second detector to measure an intensity of the second beam and generate a second intensity signal.

23. An apparatus for measuring the temperature of a substrate in a thermal processing chamber, comprising:

a reflector located to form a reflecting cavity with a substrate when the substrate is positioned in the chamber;

a temperature sensor including a probe and a detector, the probe having an input end positioned to receive radiation from the reflecting cavity and an output end optically coupled to the detector, wherein the detector measures an intensity of a first portion of the radiation entering the probe to generate a first intensity signal and measures an intensity of a second portion of the radiation entering the probe to generate a second intensity signal, and wherein the radiation entering the probe includes reflected radiation emitted by the substrate and reflected by the reflector and non-reflected radiation emitted by the substrate and not reflected by the reflector and the temperature sensor is configured so that a ratio of the reflected radiation to the non-reflected radiation is higher in the first portion than the second portion; and a processor coupled to the detector to calculate a substrate temperature from the first and second intensity signals.

24. An apparatus for measuring the temperature of a substrate in a thermal processing chamber, comprising:

a reflector located to form a reflecting cavity with a substrate when the substrate is positioned in the chamber;

a temperature sensor including a probe having an input end positioned to receive radiation from the reflecting cavity, the radiation entering the probe including reflected radiation emitted by the substrate and reflected by the reflector and non-reflected radiation emitted by the substrate and not reflected by the reflector;

means for directing a first portion of the radiation from an output end of the probe to a first detector and directing a second portion of the radiation from the output end of the probe to a second detector, wherein the directing means is configured so that a ratio of reflected radiation to non-reflected radiation is higher in the first portion than the second portion; and a processor coupled to the first and second detectors to calculate a substrate temperature from a first intensity signal from the first detector and a second intensity signal from the second detector.

25. A method of measuring the temperature of a substrate in a thermal processing chamber, comprising:

positioning a substrate in a thermal processing chamber to form a reflecting cavity with a reflector located in the chamber;

sampling radiation from the cavity with a probe and directing the sampled radiation to a detector, the sampled radiation including reflected radiation emitted by the substrate and reflected by the reflector and non-reflected radiation emitted by the substrate and not reflected by the reflector;

generating a first intensity signal for a first portion of the sampled radiation with the detector;

generating a second intensity signal for a second portion of the sample radiation with the detector, wherein a ratio of the non-reflected radiation to the reflected radiation is higher in the first portion than the second portion; and determining a temperature of the substrate from the first and second intensity signals.

26. The method of claim 25, further comprising determining an emissivity of the substrate from the first and second intensity signals.

27. The method of claim 25, wherein the detector includes a first detector surface positioned to receive the first portion of the radiation and a second detector surface positioned to receive the second portion of the radiation.

28. The method of claim 27, further comprising dividing the radiation into a first beam which is directed to the first detector surface and a second beam which is directed to the second detector surface.

* * * * *